(12) United States Patent
Kim et al.

(10) Patent No.: US 8,379,179 B2
(45) Date of Patent: Feb. 19, 2013

(54) FLAT PANEL DISPLAY HAVING PARTICULAR COMPENSATING PARTS FOR A THICKNESS DIFFERENCE BETWEEN SEALANTS

(75) Inventors: Eun-Ah Kim, Yongin (KR); Tae-Kyu Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 235 days.

(21) Appl. No.: 12/956,755

(22) Filed: Nov. 30, 2010

(65) Prior Publication Data

US 2011/0128493 A1 Jun. 2, 2011

(30) Foreign Application Priority Data

Dec. 1, 2009 (KR) .................. 10-2009-0117890

(51) Int. Cl.
*G02F 1/1339* (2006.01)
*G02F 1/1335* (2006.01)
(52) U.S. Cl. ......... 349/153; 349/117; 349/119; 349/190
(58) Field of Classification Search .............. 349/153, 349/117, 119, 190
See application file for complete search history.

(56) References Cited

U.S. PATENT DOCUMENTS

| 6,465,268 B2 * | 10/2002 | Hirakata et al. | 438/30 |
| 6,956,636 B2 * | 10/2005 | Yanagawa | 349/153 |
| 7,355,667 B2 * | 4/2008 | Yanagawa | 349/153 |
| 7,486,372 B2 * | 2/2009 | Lee et al. | 349/155 |
| 2010/0149463 A1 * | 6/2010 | Shimizu et al. | 349/106 |

FOREIGN PATENT DOCUMENTS

| JP | 11-329717 | 11/1999 |
| KR | 10-2003-0000438 | 1/2003 |
| KR | 10-2005-0070402 A | 7/2005 |
| KR | 10-2007-0071323 | 7/2007 |
| KR | 10-2007-0121973 | 12/2007 |
| KR | 10-2008-0052709 A | 6/2008 |
| WO | WO 2007/013504 A1 | 2/2007 |

OTHER PUBLICATIONS

Japanese Office Action dated May 8, 2012 of the corresponding Japanese Patent Application No. 2010-157856.

* cited by examiner

*Primary Examiner* — Mike Qi
(74) *Attorney, Agent, or Firm* — Christie, Parker & Hale, LLP

(57) ABSTRACT

A flat panel display including a first substrate, a second substrate, a light emitting region between the first and second substrates, and a sealant applied outside of the light emitting region, wherein the sealant has a rectangular shape and includes a first sealing part and a third sealing part opposite each other, and a second sealing part and a fourth sealing part opposite each other, the first, second, third, and fourth sealing parts being interconnected, and wherein the flat panel display includes a compensating part corresponding to at least one of the first, second, third, and fourth sealing parts on or in the first or second substrate.

22 Claims, 8 Drawing Sheets

FLAT PANEL DISPLAY HAVING PARTICULAR COMPENSATING PARTS FOR A THICKNESS DIFFERENCE BETWEEN SEALANTS

CROSS-REFERENCE TO RELATED APPLICATION

This application claims priority to and the benefit of Korean Patent Application No. 2009-117890, filed Dec. 1, 2009, the entire content of which is hereby incorporated herein by reference.

BACKGROUND

1. Field

One or more embodiments of the present invention relates to a flat panel display which can compensate for a thickness difference between sealants and/or enhance instrument intensity.

2. Description of the Related Art

With the rapid development of information and communication industries, displays are rapidly increasing in use. Displays which can meet the requirements of low power consumption, light-weight, thin size, and high resolution are in demand. To meet such demands, liquid crystal displays or displays using organic light emitting characteristics have been developed.

In general, in flat panel displays such as liquid crystal displays (LCD) and organic light emitting diode displays (OLED), a light emitting region is formed between two substrates opposite (or facing) each other, and a sealant is applied outside of the light emitting region to bond the two substrates and seal the light emitting region, thereby protecting the light emitting region against external moisture, oxygen, etc.

The process of applying the sealant is to apply a sealant composed of a thermosetting resin into a desired pattern, and a dispenser printing method or a screen printing method is usually employed for this process.

The dispenser printing method involves filling a dispenser with a sealant and applying a set or predetermined pressure to form a seal pattern with a desired width and thickness.

SUMMARY OF THE INVENTION

Aspects of embodiments of the present invention are directed toward a flat panel display which can compensate for a thickness difference between sealants to keep an interval between a first substrate and a second substrate uniform and remove a stress applied to the first and second substrates to enhance instrument intensity.

An embodiment of the present invention provides a flat panel display including a first substrate, a second substrate, a light emitting region between the first and second substrates, and a sealant applied outside of the light emitting region, wherein the sealant has a rectangular shape and includes a first sealing part and a third sealing part opposite each other, and a second sealing part and a fourth sealing part opposite each other, the first, second, third, and fourth sealing parts being interconnected, and wherein the flat panel display includes a compensating part corresponding to at least one of the first, second, third, and fourth sealing parts on or in the first or second substrate.

The first and third sealing parts extending in a direction parallel with a direction in which the sealant may be applied are thinner than the second and fourth sealing parts extending in a direction perpendicular to the direction in which the sealant is applied.

The compensating part may have a substantially same thickness as a thickness difference between the first and third sealing parts extending in a direction parallel with a direction in which the sealant is applied, and the second and fourth sealing parts extending in a direction perpendicular to the direction in which the sealant is applied.

The compensating part may correspond to the first and third sealing parts extending in parallel with a direction in which the sealant is applied, and the compensating part may be a protrusion on the first or second substrate.

The compensating part may correspond to the second and fourth sealing parts extending in a direction perpendicular to a direction in which the sealant is applied, and the compensating part may be a groove in the first or second substrate.

The compensating part may include: a first compensating part corresponding to the first and third sealing parts extending in a direction parallel with a direction in which the sealant is applied; and a second compensating part corresponding to the second and fourth sealing parts formed in a direction perpendicular to the direction in which the sealant is applied, wherein the first compensating part may be a groove in the first or second substrate, and the second compensating part may be a protrusion on the first or second substrate.

The compensating part may include a portion of the first or second substrate extending to be thicker than the surrounding portions of the first or second substrate.

The compensating part may include a separate film on the first or second substrate.

One or more thin films may be on the first or second substrate, and the one or more thin films may include a recession or protrusion with a substantially same thickness as the compensating part corresponding to the compensating part.

Another embodiment of the present invention provides a flat panel display including a first substrate, a second substrate, a light emitting region between the first and second substrates, and a sealant applied outside of the light emitting region, wherein the sealant has a rectangular shape and includes a first sealing part and a third sealing part opposite each other, and a second sealing part and a fourth sealing part opposite each other, the first, second, third, and fourth sealing parts being interconnected, wherein at least one thin film is stacked on at least one of the first and second substrates, and wherein the at least one thin film includes a compensating part corresponding to at least one of the first, second, third, and fourth sealing parts.

The first and third sealing parts extending in a direction parallel with a direction in which the sealant is applied may be thinner than the second and fourth sealing parts extending in a direction perpendicular to the direction in which the sealant is applied.

The compensating part may have a substantially same thickness as a thickness difference between the first and third sealing parts extending in a direction parallel with a direction in which the sealant is applied, and the second and fourth sealing parts extending in a direction perpendicular to the direction in which the sealant is applied.

The at least one thin film may include a recession or a protrusion with a substantially same thickness as the compensating part corresponding to the compensating part.

The compensating part may correspond to the sealing parts extending in parallel with a direction in which the sealant is applied, and the compensating part may be a protrusion.

The compensating part may correspond to the sealing parts extending in a direction perpendicular to a direction in which the sealant is applied, and the compensating part may be a groove.

The compensating part may include: a first compensating part corresponding to the sealing parts extending in parallel with a direction in which the sealant is applied; and a second compensating part corresponding to the sealing parts formed in a direction perpendicular to the direction in which the sealant is applied, wherein the first compensating part may be a groove, and the second compensating part may be a protrusion.

Another embodiment of the present invention provides a flat panel display including: a first substrate; a second substrate opposite the first substrate; a light emitting region between the first and second substrates; and a sealant applied to the first substrate or the second substrate to have a rectangular shape, the sealant including first and third sealing parts opposite each other, and second and fourth sealing parts opposite each other, the first, second, third, and fourth parts being interconnected, wherein thicknesses of the first and third sealing parts are different from thicknesses of the second and fourth sealing parts, and a compensating part corresponding to at least one of the first, second, third, and fourth sealing parts is in or on the first substrate or the second substrate.

The compensating part may correspond to the thinner sealing parts of the first and third sealing parts and the second and fourth sealing parts, and the compensating part may be a protrusion on the first or second substrate.

The compensating part may correspond to the thicker sealing parts of the first and third sealing parts, and the second and fourth sealing parts, and the compensating part may be a recession.

The compensating part may include: a first compensating part corresponding to the thicker sealing parts of the first and third sealing parts, and the second and fourth sealing parts; and a second compensating part corresponding to the thinner sealing parts of the first and third sealing parts, and the second and fourth sealing parts, wherein the first compensating part may be a groove in the first or second substrate, and the second compensating part may be a protrusion in the first or second substrate.

One or more thin films may be on the first or second substrate, and the one or more thin films may include a recession or protrusion with a substantially same thickness as the compensating part corresponding to the compensating part.

The compensating part may have a substantially same thickness as a difference between thicknesses of the first and third sealing parts, and thicknesses of the second and fourth sealing parts.

Additional aspects and/or advantages of the invention will be set forth in part in the description which follows and, in part, will be apparent from the description, or may be learned by practice of the invention.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In general, in flat panel displays such as liquid crystal displays (LCD) and organic light emitting diode displays (OLED), a light emitting region is formed between two substrates opposite (or facing) each other, and a sealant is applied outside of the light emitting region to bond the two substrates and seal the light emitting region, thereby protecting the light emitting region against external moisture, oxygen, etc.

The process of applying the sealant is to apply a sealant composed of a thermosetting resin into a desired pattern, and a dispenser printing method or a screen printing method is usually employed for this process.

The dispenser printing method involves filling a dispenser with a sealant and applying a set or predetermined pressure to form a seal pattern with a desired width and thickness.

In the screen printing method, when a sealant is applied on a mask where a pattern is formed, the sealant is rubbed with a squeegee to allow the sealant to be applied on a substrate through the pattern of the mask, thereby forming a seal pattern.

When the sealant is applied on the substrate to form the seal pattern as described above, a thickness of the seal pattern becomes non-uniform when an applied pressure is not constant.

In particular, when the screen printing method is employed to apply the sealant, the sealant is rubbed with the squeegee. Some of the sealant is moved back and accumulated in a direction in which the sealant is applied during the rubbing even when the constant pressure is applied, and thus the thickness of the seal pattern becomes non-uniform due to the accumulation.

Specifically, the accumulated sealant becomes relatively thicker in a case where the pattern length is long as compared to a case where the pattern length is short, in a direction of forming the pattern.

For example, when the sealant is applied from a left or right side to form a rectangular seal pattern, the seal pattern to be formed on a top or bottom side becomes thicker than the seal pattern to be formed on the left or right side because the seal pattern to be formed on the top or bottom side is longer than the seal pattern to be formed on the left or right side.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1:
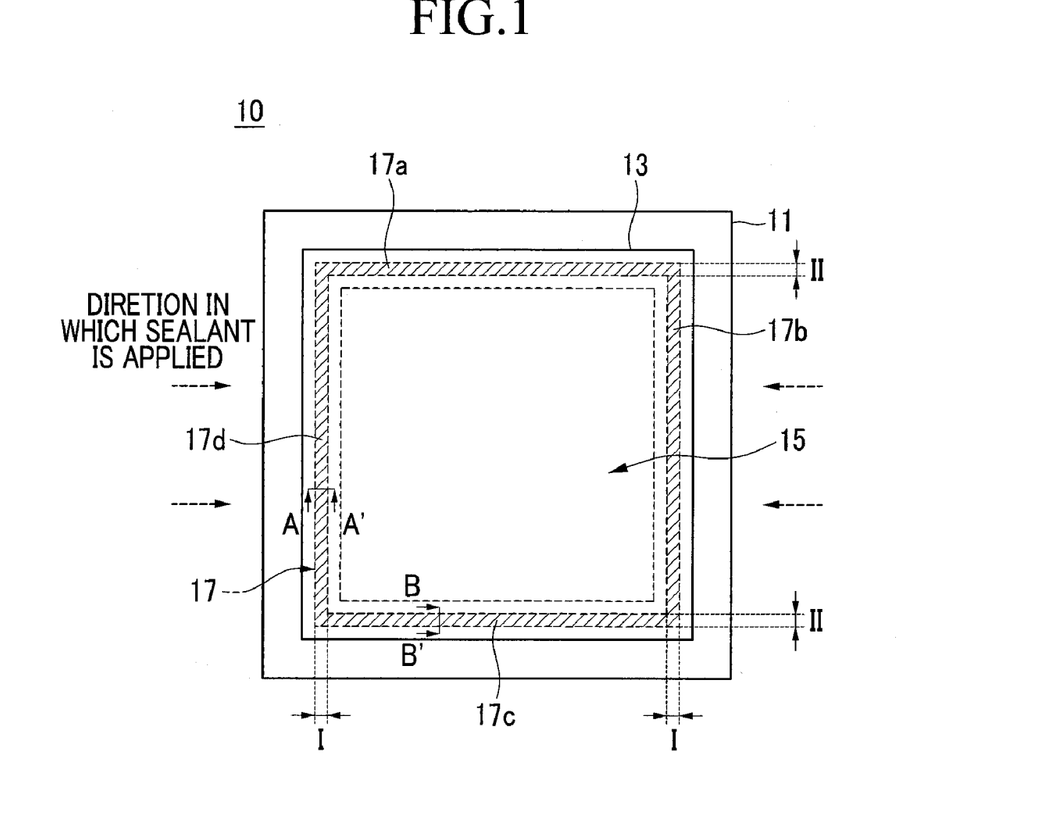
FIG. 1 is a plan view of a flat panel display according to an embodiment of the present invention.
Figure 2A:
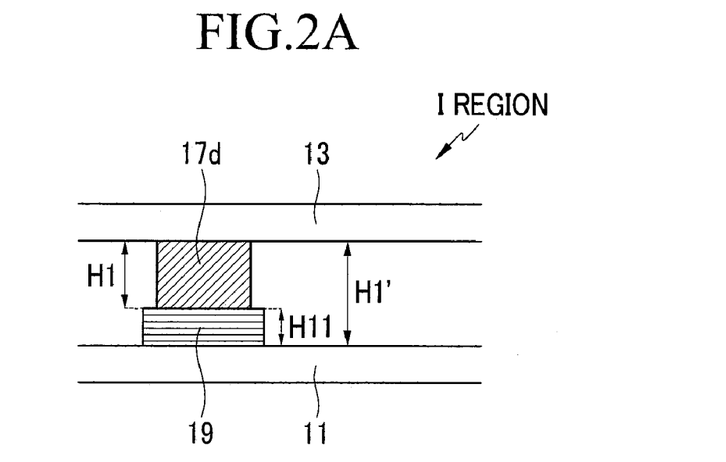
FIGS. 2A and 2B are cross-sectional views taken along lines A-A' and B-B' of FIG. 1, respectively, when a sealant is applied from left to right or from right to left according to an embodiment of the present invention.
Figure 2B:
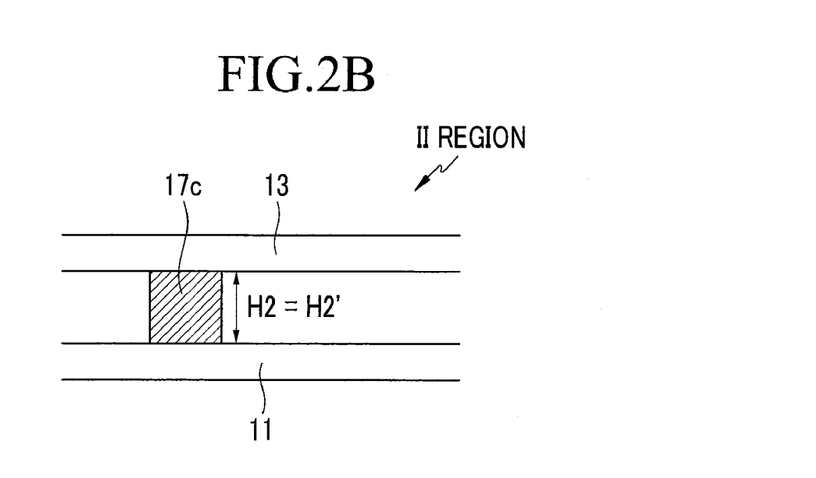
Figure 2C:
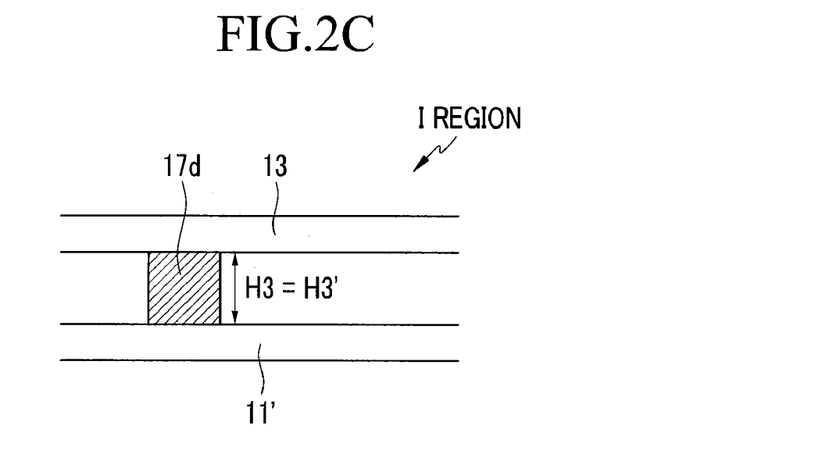
FIGS. 2C and 2D are cross-sectional views taken along lines A-A' and B-B' of FIG. 1, respectively, when a sealant is applied from left to right or from right to left according to an embodiment of the present invention.
Figure 2D:
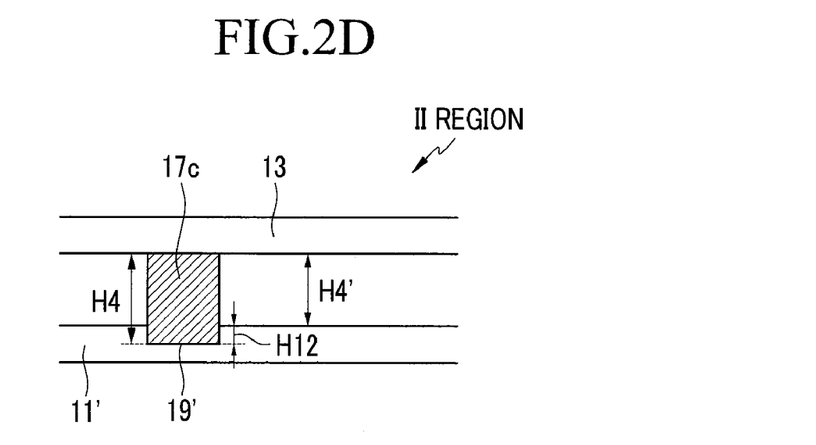
Figure 2E:
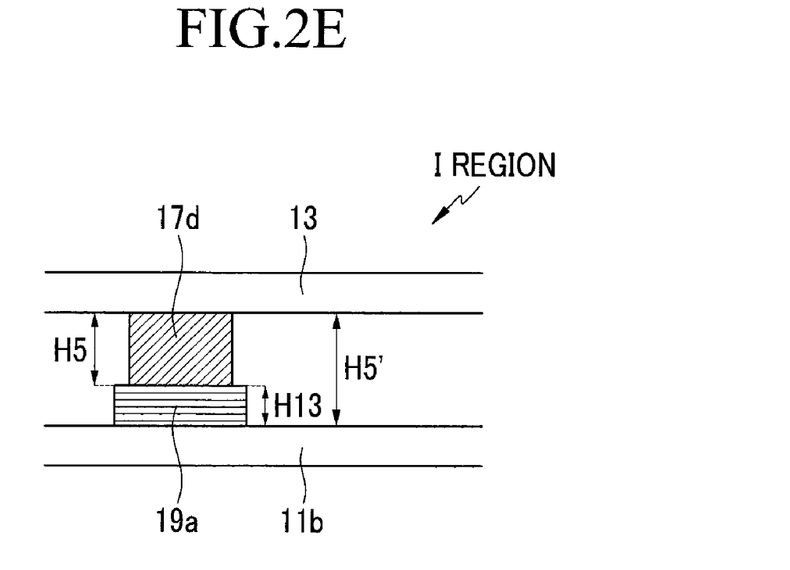
FIGS. 2E and 2F are cross-sectional views taken along lines A-A' and B-B' of FIG. 1, respectively, when a sealant is applied from left to right or from right to left according to an embodiment of the present invention.
Figure 2F:
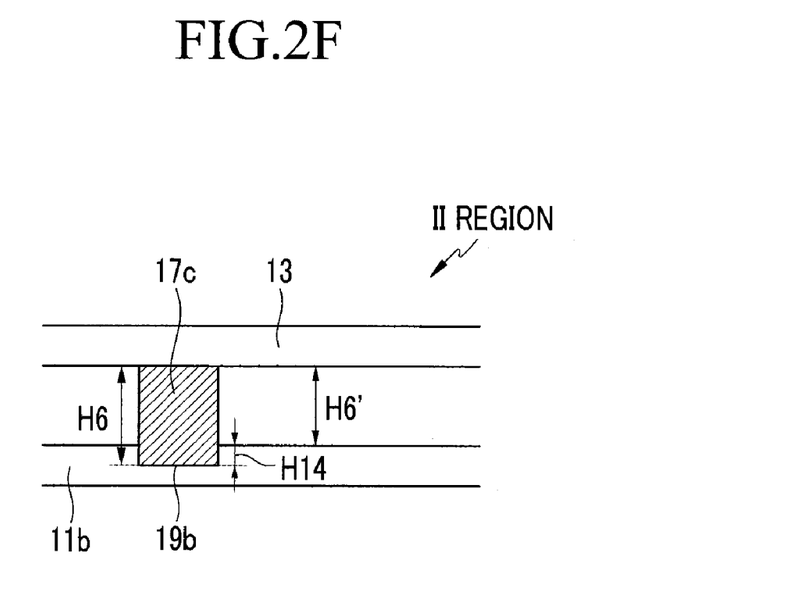

FIG. 1 is a plan view of a flat panel display according to an embodiment of the present invention. FIGS. 2A and 2B are cross-sectional views taken along lines A-A' and B-B' of FIG. 1, respectively, when a sealant is applied from left to right or from right to left according to an embodiment of the present invention. FIGS. 2C and 2D are cross-sectional views taken along lines A-A' and B-B' of FIG. 1, respectively, when a sealant is applied from left to right or from right to left according to an embodiment of the present invention. FIGS. 2E and 2F are cross-sectional views taken along lines A-A' and B-B' of FIG. 1, respectively, when a sealant is applied from left to right or from right to left according to an embodiment of the present invention.

Referring to FIG. 1, a flat panel display 10 according to an embodiment of the present invention includes a first substrate 11, 11' (see FIGS. 2C and 2D), 11b (see FIGS. 2E and 2F), a second substrate 13, a light emitting region 15 formed between the first substrate 11, 11', 11b and the second substrate 13, and a sealant 17 applied along the outside of the light emitting region 15 to bond the first substrate 11, 11', 11b and the second substrate 13, and seal the light emitting region 15.

The sealant 17 is applied along the edge (or edge portion) of the first substrate 11, 11', 11b or the second substrate 13, and the applied sealant 17 has a rectangular shape, and is composed of a first sealing part 17a, a second sealing part 17b, a third sealing part 17c, and a fourth sealing part 17d that are interconnected.

That is, the sealant 17 is applied to have a rectangular shape where the first and third sealing parts 17a and 17c opposite each other, and the second and fourth sealing parts 17b and 17d opposite each other, are interconnected.

The light emitting region 15, for example, may be formed between the first substrate 11, 11', 11b and the second substrate 13 with an OLED or liquid crystal interposed therebetween, however, a method of forming the light emitting region 15 is not limited thereto.

Thus, the light emitting region 15 is sealed by the first substrate 11, 11', 11b and the second substrate 13 (opposite each other) and the sealant 17, and thus it is protected against external moisture, oxygen, etc.

When the sealant 17 is applied from left to right or from right to left, thicknesses of the first and third sealing parts 17a and 17c formed in a direction parallel to the direction in which the sealant is applied become thicker than those of the second and fourth sealing parts 17b and 17d formed in a direction perpendicular (or vertical) to the direction in which the sealant is applied.

Thus, as shown in FIGS. 2A-2F, a compensating part for compensating for a difference between thicknesses of the first and third sealing parts 17a and 17c, and those of the second and fourth sealing parts 17b and 17d, is formed in a position corresponding to the first and third sealing parts 17a and 17c, in a position corresponding to the second and fourth sealing parts 17b and 17d, or in a position corresponding to the first, second, third, and fourth sealing parts 17a, 17b, 17c, and 17d.

To be specific, as shown in FIGS. 2A and 2B, when the compensating part 19 is formed in a position corresponding to the second and fourth sealing parts 17b and 17d formed in a direction perpendicular (or vertical) to the direction in which the sealant is applied, the compensating part 19 is a protrusion that has the same thickness H11 as the difference between the thickness H1 of the fourth sealing part 17d and the thickness H2 of the third sealing part 17c. See FIG. 2B Thus, the compensating part 19 allows an interval H1' between the first substrate 11, 11', 11b and the second substrate 13 in the region I to be the same as the interval H2' between the first substrate 11, 11', 11b and the second substrate 13 in the region II.

As shown in FIGS. 2C and 2D, when the compensating part 19' is formed in a position corresponding to the first and third sealing parts 17a and 17c formed in parallel with the direction in which the sealant is applied, the compensating part 19' is a groove that has the same thickness H12 as the thickness difference between the thickness H3 of the fourth sealing part 17d and the thickness H4 of the third sealing part 17c.

Thus, the compensating part 19' allows an interval H3' between the first substrate 11' and the second substrate 13 in the region I to be the same as the interval H4' between the first substrate 11' and the second substrate 13 in the region II.

As shown in FIGS. 2E and 2F, when compensating parts 19a and 19b are formed in a position corresponding to the second and fourth sealing parts 17b and 17d formed in a direction perpendicular to the direction in which the sealant is applied and in a position corresponding to the first and third sealing parts 17a and 17c formed in a direction in parallel with the direction in which the sealant is applied, a first compensating part 19a corresponding to the second and fourth sealing parts 17b and 17d is a protrusion, and a second compensating part 19b corresponding to the first and third sealing parts 17a and 17c is a groove.

In this case, the sum of the thickness H13 of the first compensating part 19a and the thickness H14 of the second compensating part 19b is equal to a difference between the thickness H5 of the fourth sealing part 17d and the thickness H6 of the third sealing part 17c.

Thus, the compensating parts 19a and 19b allow the interval H5' between the first substrate 11b and the second substrate 13 in the region I to be the same as the interval H6' between the first substrate 11b and the second substrate 13 in the region II.

That is, among the first and third sealing parts 17a and 17c, and the second and fourth sealing parts 17b and 17d, the compensating part 19b corresponding to the thick sealing parts becomes a protrusion, and the compensating part 19a corresponding to the thin sealing parts becomes a groove.

When the compensating part 19a is a protrusion, the first substrate 11b may be extended to be thicker, or the compensating part 19a may be a separate film deposited on the first substrate.

In addition, when the compensating part 19a is a protrusion, the fourth sealing part 17d may be formed to cover the top surface of the compensating part 19a, surround the compensating part 19a or expose some of the top surface of the compensating part 19a. However, the fourth sealing part 17d is preferably formed to surround the compensating part 19a to enhance the sealing property.

In addition, when the compensating pat 19a is a protrusion, the material of the compensating part 19a is not particularly limited, and may be formed of an organic film, an inorganic film, a metal film, etc.

The compensating parts 19, 19', 19a, and 19b are shown to be formed on the first substrate 11 or 11b. In the present embodiment, however, they may be formed on and/or in the second substrate 13.

It has been described that the direction in which the sealant is applied is from left to right or from right to left in the present embodiment, however, the compensating part may also be formed to be a protrusion or groove corresponding to the sealant even if the sealant is applied from top to bottom or from bottom to top.

In the flat panel display 10 according to an embodiment discussed above, it has been described that no film is deposited on a region of the first substrate corresponding to a position where the compensating part is formed.

Hereinafter, a case where a film is deposited on a region of the first substrate corresponding to the position where the compensating part is formed will be described with reference to an OLED as one kind of the flat panel display However, features of the following embodiments of present invention that will be sufficiently understood from above embodiments by those skilled in the art will not be provided again, but certain differences will be described below.

Figure 3A:
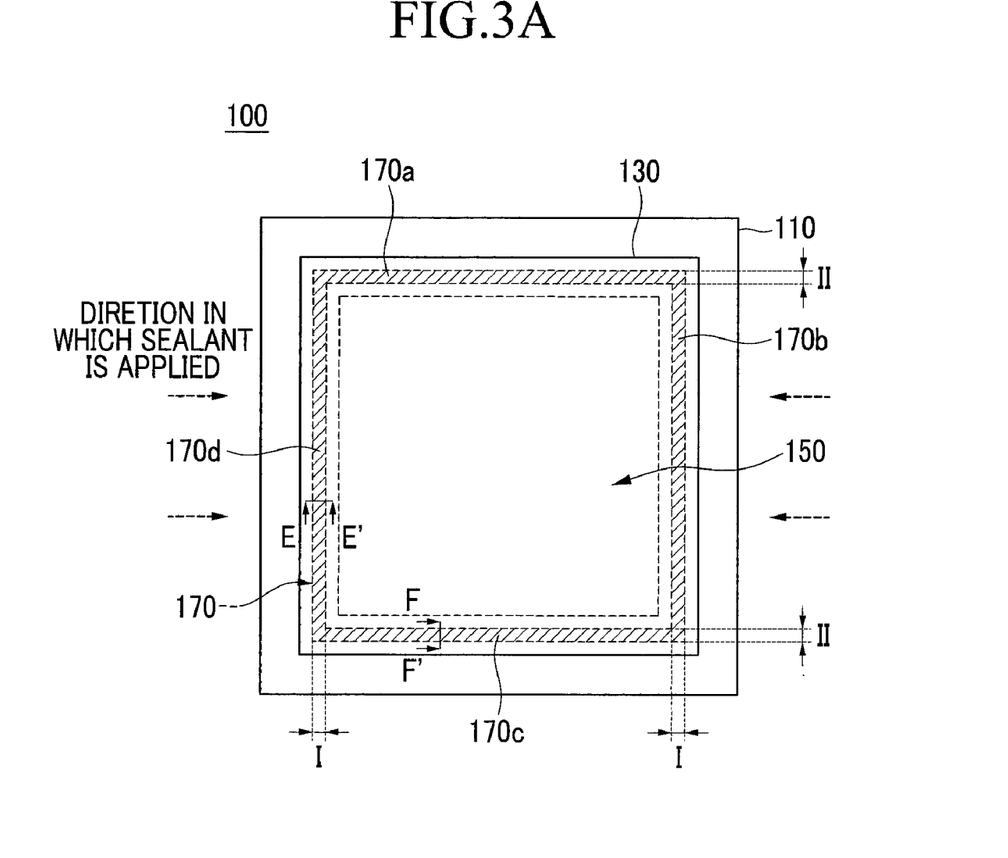
FIG. 3A is a plan view of an OLED in accordance with an embodiment of the present invention.
Figure 3B:
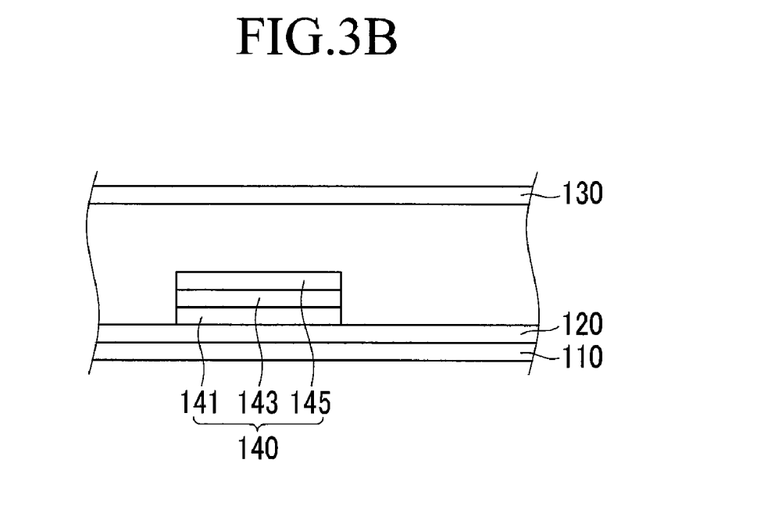
FIG. 3B is a cross-sectional view of an exemplary pixel of the OLED of FIG. 3A.

FIG. 3A is a plan view of an OLED in accordance with an embodiment of the present invention. FIG. 3B is a cross-sectional view of an exemplary pixel of the OLED of FIG. 3A.

Figure 4A:
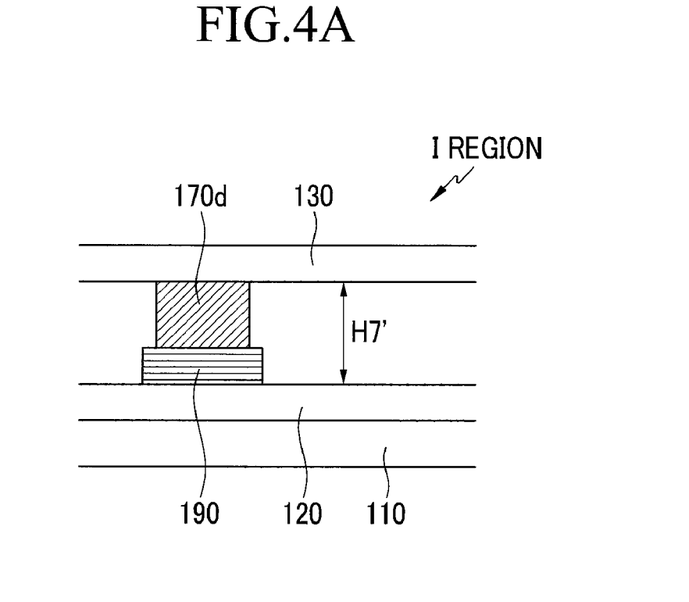
FIG. 4A is a cross-sectional view taken along line E-E' of FIG. 3A when a sealant is applied from left to right or from right to left according to an embodiment of the present invention.
Figure 4B:
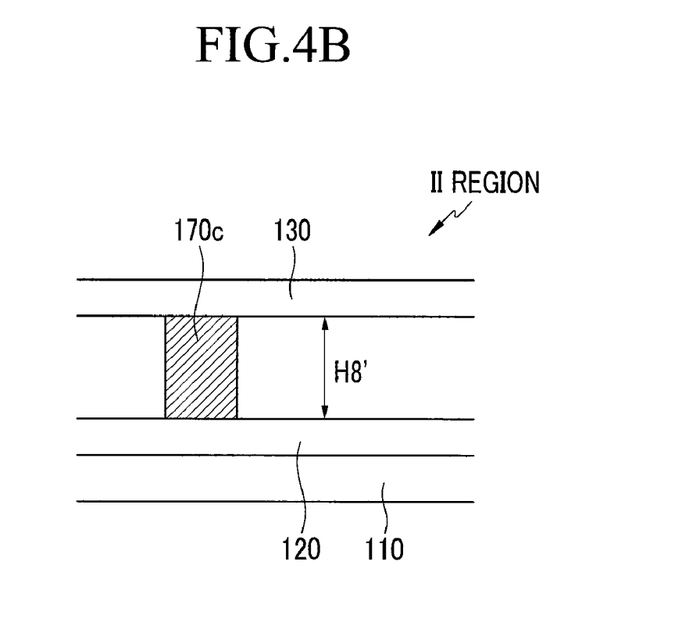
FIG. 4B is a cross-sectional view taken along line F-F' of FIG. 3A when a sealant is applied from left to right or from right to left according to an embodiment of the present invention.
Figure 5A:
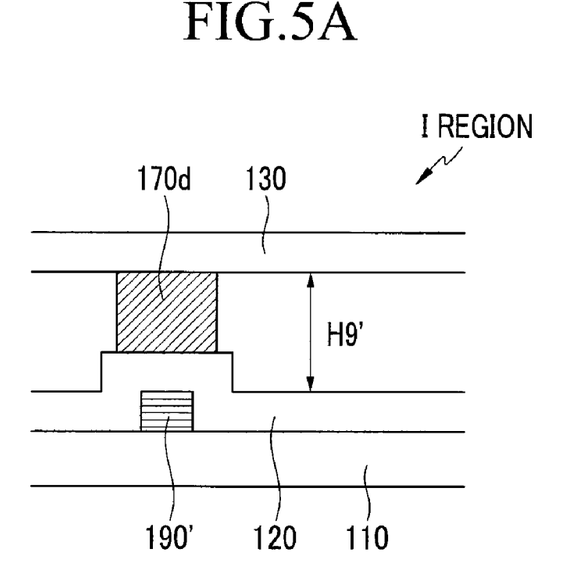
FIG. 5A is a cross-sectional view taken along the line E-E' of FIG. 3A according to an embodiment of the present invention.
Figure 5B:
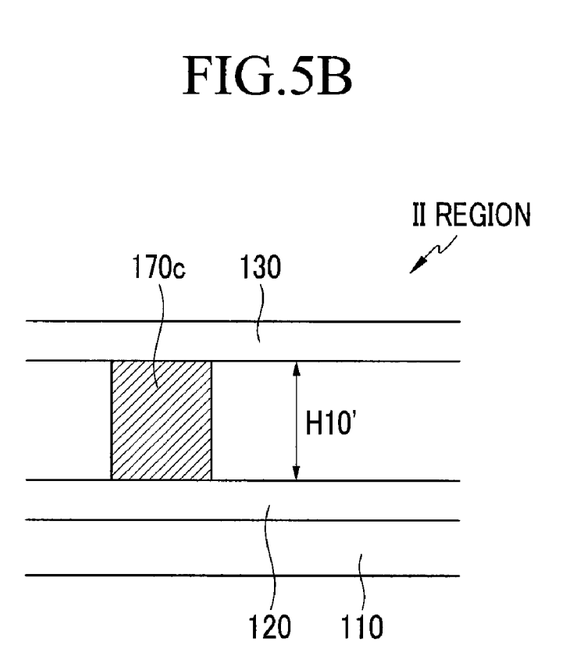
FIG. 5B is a cross-sectional view taken along the line F-F' of FIG. 3A according to an embodiment of the present invention.
Figure 5C:
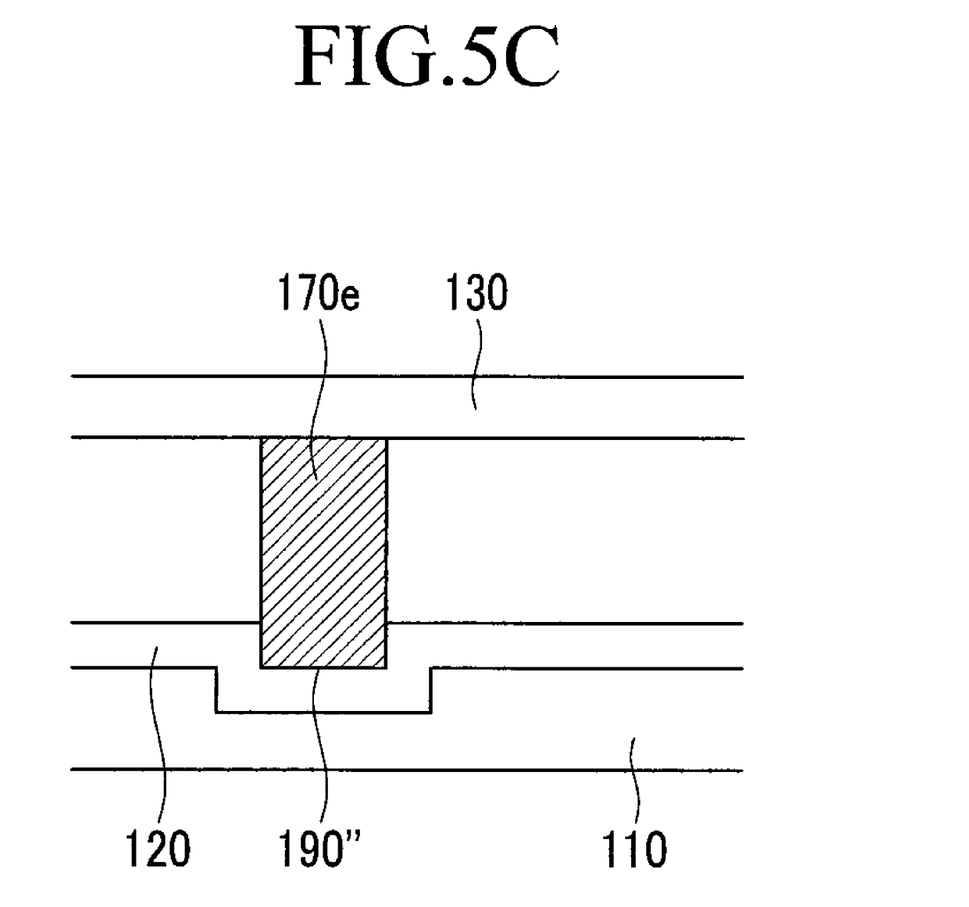
FIG. 5C is a cross-sectional view taken along the line F-F' of FIG. 3A according to an embodiment of the present invention.

FIG. 4A is a cross-sectional view taken along line E-E' of FIG. 3A when a sealant is applied from left to right or from right to left. FIG. 4B is a cross-sectional view taken along line F-F' of FIG. 3A when a sealant is applied from left to right or from right to left. FIG. 5A is a cross-sectional view taken along the line E-E' of FIG. 3A according to an embodiment of the present invention. FIG. 5B is a cross-sectional view taken along the line F-F' of FIG. 3A according to an embodiment of the present invention. FIG. 5C is a cross-sectional view taken along the line F-F' of FIG. 3A according to an embodiment of the present invention.

Referring to FIGS. 3A and 3B, an OLED 100 according to an embodiment of the present invention includes a first substrate 110 where an insulating film 120 is formed, a second substrate 130 opposite the first substrate 110, a light emitting region 150 formed between the first substrate 110 and the second substrate 130, and a sealant 170 applied along the outside of the light emitting region 150 to bond the first substrate 110 and the second substrate 130, and seal the light emitting region 150.

Thus, the light emitting region 150 is sealed by the first substrate 110 and the second substrate 130 opposite each other, and the sealant 170, and thus it is protected against external moisture, oxygen, etc.

The sealant 170 is applied along the edge (or edge portion) of the first substrate 110 or the second substrate 130, and the applied sealant 170 has a rectangular shape and is composes of a first sealing part 170a, a second sealing part 170b, a third sealing part 17c, and a fourth sealing part 170d are interconnected.

That is, the sealant 170 is applied in a rectangular shape where the first and third sealing parts 170a and 170c opposite each other, and the second and fourth sealing parts 170b and 170d opposite each other, are interconnected.

The insulating film 120 acts to prevent (or reduce the likelihood of) moisture or impurities generated in the substrate 110 from being diffused.

The light emitting region 150 includes one or more organic light emitting diodes 140, and the organic light emitting diode 140 is formed on the insulating film 120.

The organic light emitting diodes 140 include a first electrode 141, an organic light emitting layer 143 disposed on the first electrode 141, and a second electrode 145 disposed on the organic light emitting layer 143.

In this case, a hole injection layer and a hole transport layer may be further disposed between the first electrode 141 and the organic light emitting layer 143, and an electron injection layer and an electron transport layer may be further disposed between the organic light emitting layer 143 and the second electrode 145.

Referring to FIGS. 4A and 4B, here, the compensating part 190 is not formed directly on the first substrate 110 but on the insulating film 120, and the compensating part 190 may be formed by extending the insulating film 120 to be thicker or may be formed by depositing a separate film.

In addition, referring to FIGS. 5A and 5B, when the compensating part 190 is formed on the first substrate 110, and the insulating film 120 is formed on the first substrate 110 and the compensating part 190', the thickness of the compensating part 190' is included in the insulating film 120 formed on the compensating part 190', and thus the insulating film 120 includes a protrusion of the same thickness as the compensating part 190'.

Thus, with the structure shown in FIGS. 4A, 4B, 5A, and 5B the heights H7' and H9' between the first substrate 110 and the second substrate 130 in the region I where the second and fourth sealing parts 170b and 170d are disposed in a direction perpendicular to the direction in which the sealant is applied can be equal to the heights H8' and H10', respectively, between the first substrate 110 and the second substrate 130 in the region II.

It has been described with reference to FIGS. 4A, 4B, 5A, and 5B that the sealant 170 is applied from left to right or from right to left, however, it will be understood that the present embodiment may also be embodied even when the sealant is applied from top to bottom or from bottom to top.

In addition, it has been described that the compensating part 190' is formed in a position corresponding to the thinner sealant in the second embodiment, however, the present embodiment may also be embodied even when the compensating part is formed in a position corresponding to the thicker sealant.

That is, as shown in FIG. 5C when the compensating part 190" is formed on the first substrate 110 to correspond to the thicker sealant, the compensating part 190" has a groove shape (or is a groove) and the thickness of the compensating part 190" is included in the insulating film 120 formed on the compensating part 190", and thus the insulating film 120 includes a recession of the same thickness as the compensating part 190".

In addition, it has been described that one film is formed on the first substrate 110 in a case of the passive type OLED, however, in the case of the active type OLED, a plurality of films may be deposited on the first substrate 110.

Figure 6:
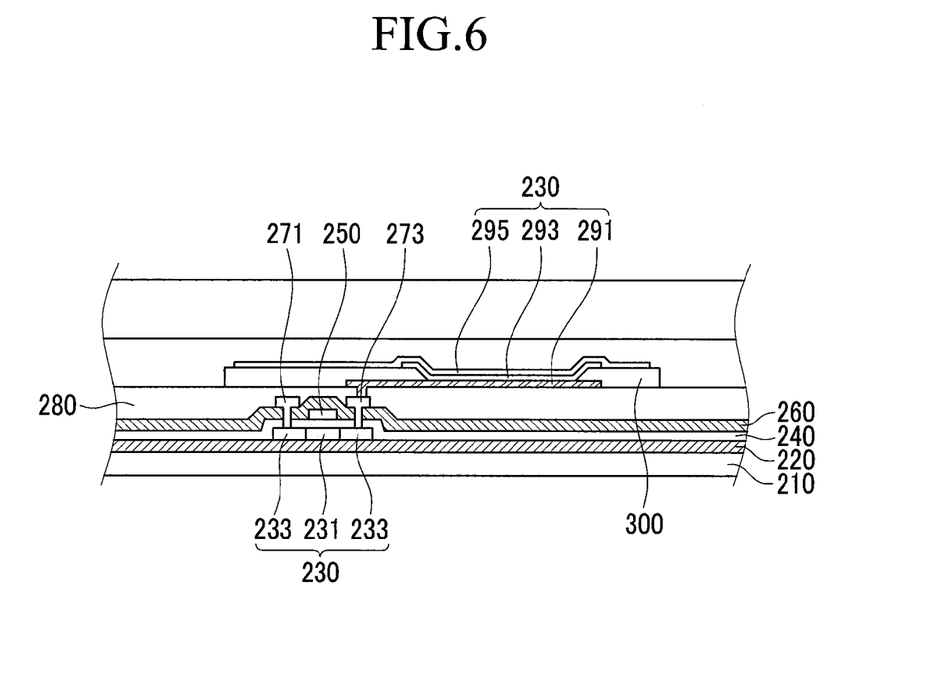
FIG. 6 is a cross-sectional view of another exemplary pixel of the OLED of FIG. 4A.

FIG. 6 is a cross-sectional view of another exemplary pixel of the OLED of FIG. 4A.

Referring to FIG. 6, unlike the passive type OLED where organic light emitting diodes are disposed only on the first and second substrates, the active type OLED includes an organic light emitting diode, and a thin film transistor electrically coupled to the organic light emitting diodes for controlling light emission of the organic light emitting diodes, between the first and second substrates.

A buffer layer 220 is formed on a first substrate 210, and a semiconductor layer 230 including an active layer 231 and source/drain regions 233 are formed on the buffer layer 220.

A gate insulating layer 240 is formed on the buffer layer 220 including the semiconductor layer 230, and a gate electrode 250 corresponding to the active layer 231 is formed on the gate insulating layer 240.

An interlayer insulating layer 260 is formed on the gate insulating layer 240 including the gate electrode 250, source/drain electrodes 271 and 273 are formed in regions (e.g., predetermined regions) on the interlayer insulating layer 260, and the source/drain electrodes 271 and 273 are connected to the source/drain regions 233 through holes formed in the interlayer insulating layer 260, respectively.

A planarization layer 280 is formed on the interlayer insulating layer 260 including the source/drain electrodes 271 and 273.

A first electrode 291 is formed on one region of the planarization layer 280, and the first electrode 291 is connected to any one of the source/drain electrodes 271 and 273 through the hole formed in the planarization layer 280.

A pixel-defining layer 300 having an opening exposing at least one region of the first electrode 291 is formed on the planarization layer 280 including the first electrode 291.

An organic light emitting layer 293 is formed on the opening of the pixel-defining layer 300, and a second electrode 295 is formed on the pixel-defining layer 300 including the organic light emitting layer 293.

When the sealant is formed on the planarization layer 280, the compensating part may be formed on the planarization layer 280. Besides the planarization layer 280, the compensating part may be formed in any one of the layers formed below the sealant, for example, the buffer layer, the gate insulating layer, or the interlayer insulating layer, and the formed compensating part may have an effect even up to the planarization layer 280.

Consequently, a difference in thickness between sealants can be compensated to keep an interval between first and second substrates uniform, and a stress applied to the first and second substrates can be removed to enhance instrument intensity.

While aspects of the present invention have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A flat panel display comprising a first substrate, a second substrate, a light emitting region between the first and second substrates, and a sealant applied outside of the light emitting region,
   wherein the sealant has a rectangular shape and comprises a first sealing part and a third sealing part opposite each other, and a second sealing part and a fourth sealing part opposite each other, the first, second, third, and fourth sealing parts being interconnected, and
   wherein the flat panel display comprises a compensating part corresponding to at least one of the first, second, third, and fourth sealing parts on or in the first or second substrate.

2. The flat panel display according to claim 1, wherein the first and third sealing parts extending in a direction parallel with a direction in which the sealant is applied are thinner than the second and fourth sealing parts extending in a direction perpendicular to the direction in which the sealant is applied.

3. The flat panel display according to claim 1, wherein the compensating part has a substantially same thickness as a thickness difference between the first and third sealing parts extending in a direction parallel with a direction in which the sealant is applied, and the second and fourth sealing parts extending in a direction perpendicular to the direction in which the sealant is applied.

4. The flat panel display according to claim 1, wherein the compensating part corresponds to the first and third sealing parts extending in parallel with a direction in which the sealant is applied, and the compensating part is a protrusion on the first or second substrate.

5. The flat panel display according to claim 4, wherein the compensating part comprises a portion of the first or second substrate extending to be thicker than the surrounding portions of the first or second substrate.

6. The flat panel display according to claim 4, wherein the compensating part comprises a separate film on the first or second substrate.

7. The flat panel display according to claim 1, wherein the compensating part corresponds to the second and fourth sealing parts extending in a direction perpendicular to a direction in which the sealant is applied, and the compensating part is a groove in the first or second substrate.

8. The flat panel display according to claim 1, wherein the compensating part comprises:
   a first compensating part corresponding to the first and third sealing parts extending in a direction parallel with a direction in which the sealant is applied; and
   a second compensating part corresponding to the second and fourth sealing parts formed in a direction perpendicular to the direction in which the sealant is applied,
   wherein the first compensating part is a groove in the first or second substrate, and the second compensating part is a protrusion on the first or second substrate.

9. The flat panel display according to claim 1, wherein one or more thin films are on the first or second substrate, and wherein the one or more thin films comprises a recession or protrusion with a substantially same thickness as the compensating part.

10. A flat panel display comprising a first substrate, a second substrate, a light emitting region between the first and second substrates, and a sealant applied outside of the light emitting region,
    wherein the sealant has a rectangular shape and comprises a first sealing part and a third sealing part opposite each other, and a second sealing part and a fourth sealing part opposite each other, the first, second, third, and fourth sealing parts being interconnected,
    wherein at least one thin film is stacked on at least one of the first and second substrates, and
    wherein the at least one thin film comprises a compensating part corresponding to at least one of the first, second, third, and fourth sealing parts.

11. The flat panel display according to claim 10, wherein the first and third sealing parts extending in a direction parallel with a direction in which the sealant is applied are thinner than the second and fourth sealing parts extending in a direction perpendicular to the direction in which the sealant is applied.

12. The flat panel display according to claim 10, wherein the compensating part has a substantially same thickness as a thickness difference between the first and third sealing parts extending in a direction parallel with a direction in which the sealant is applied, and the second and fourth sealing parts extending in a direction perpendicular to the direction in which the sealant is applied.

13. The flat panel display according to claim 10, wherein the at least one thin film comprises a recession or a protrusion with a substantially same thickness as the compensating part.

14. The flat panel display according to claim 10, wherein the compensating part corresponds to the sealing parts extending in parallel with a direction in which the sealant is applied, and the compensating part is a protrusion.

15. The flat panel display according to claim 10, wherein the compensating part corresponds to the sealing parts extending in a direction perpendicular to a direction in which the sealant is applied, and the compensating part is a groove.

16. The flat panel display according to claim 10, wherein the compensating part comprises:
   a first compensating part corresponding to the sealing parts extending in parallel with a direction in which the sealant is applied; and
   a second compensating part corresponding to the sealing parts formed in a direction perpendicular to the direction in which the sealant is applied,
   wherein the first compensating part is a groove, and the second compensating part is a protrusion.

17. A flat panel display comprising:
   a first substrate;
   a second substrate opposite the first substrate;
   a light emitting region between the first and second substrates; and
   a sealant applied to the first substrate or the second substrate to have a rectangular shape, the sealant comprising first and third sealing parts opposite each other, and second and fourth sealing parts opposite each other, the first, second, third, and fourth parts being interconnected,
   wherein thicknesses of the first and third sealing parts are different from thicknesses of the second and fourth sealing parts, and a compensating part corresponding to at least one of the first, second, third, and fourth sealing parts is in or on the first substrate or the second substrate.

18. The flat panel display according to claim 17, wherein the compensating part corresponds to the thinner sealing parts of the first and third sealing parts and the second and fourth sealing parts, and the compensating part is a protrusion on the first or second substrate.

19. The flat panel display according to claim 17, wherein the compensating part corresponds to the thicker sealing parts of the first and third sealing parts, and the second and fourth sealing parts, and the compensating part is a recession.

20. The flat panel display according to claim 17, wherein the compensating part comprises:
   a first compensating part corresponding to the thicker sealing parts of the first and third sealing parts, and the second and fourth sealing parts; and
   a second compensating part corresponding to the thinner sealing parts of the first and third sealing parts, and the second and fourth sealing parts,
   wherein the first compensating part is a groove in the first or second substrate, and the second compensating part is a protrusion in the first or second substrate.

21. The flat panel display according to claim 17, wherein one or more thin films are on the first or second substrate, and wherein the one or more thin films comprises a recession or protrusion with a substantially same thickness as the compensating part.

22. The flat panel display according to claim 17, wherein the compensating part has a substantially same thickness as a difference between thicknesses of the first and third sealing parts, and thicknesses of the second and fourth sealing parts.

* * * * *